(12) United States Patent
Kurz et al.

(10) Patent No.: US 11,507,836 B1
(45) Date of Patent: Nov. 22, 2022

(54) FEDERATED LEARNING USING LOCAL GROUND TRUTH ESTIMATION

(71) Applicant: Apple Inc., Cupertino, CA (US)

(72) Inventors: Daniel Kurz, Sunnyvale, CA (US); Muhammad Ahmed Riaz, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 232 days.

(21) Appl. No.: 17/122,327

(22) Filed: Dec. 15, 2020

Related U.S. Application Data

(60) Provisional application No. 62/951,532, filed on Dec. 20, 2019.

(51) Int. Cl.
| | |
|---|---|
| *G06N 3/08* | (2006.01) |
| *G06T 7/50* | (2017.01) |
| *G06K 9/62* | (2022.01) |
| *G06T 7/70* | (2017.01) |
| *G10L 15/24* | (2013.01) |

(52) U.S. Cl.
CPC ............ *G06N 3/08* (2013.01); *G06K 9/6255* (2013.01); *G06K 9/6289* (2013.01); *G06T 7/50* (2017.01); *G06T 7/70* (2017.01); *G10L 15/24* (2013.01); *G06T 2207/10028* (2013.01); *G06T 2207/20081* (2013.01); *G06T 2207/20084* (2013.01)

(58) Field of Classification Search
CPC ...... G06N 3/08; G06K 9/6255; G06K 9/6289; G06T 7/50; G06T 7/70; G06T 2207/10028; G06T 2207/20081; G06T 2207/20084; G10L 15/24

USPC .......................................................... 382/157
See application file for complete search history.

(56) References Cited

U.S. PATENT DOCUMENTS

| | | | | |
|---|---|---|---|---|
| 9,286,399 | B2 | 3/2016 | Pingree | |
| 10,438,212 | B1* | 10/2019 | Jilani | G06N 5/025 |
| 11,223,637 | B2* | 1/2022 | Neuvirth | G06N 20/20 |
| 11,403,540 | B2* | 8/2022 | Sanketi | G06N 5/048 |
| 2017/0302962 | A1* | 10/2017 | Shen | H04N 19/14 |
| 2019/0050515 | A1 | 2/2019 | Su et al. | |

(Continued)

FOREIGN PATENT DOCUMENTS

| | | | | |
|---|---|---|---|---|
| CA | 2 953 969 | | 1/2016 | |
| EP | 3709644 | * | 9/2020 | H04N 19/11 |

OTHER PUBLICATIONS

Konecny, Jacub; McMahan, H. Brendan, Yu, Felix X., Suresh, Ananda Theertha and Bacon, Dave; "Federated Learning: Strategies For Improving Communication Efficiency"; arXiv:1610.05492v2 [cs.LG]; Oct. 30, 2017, pp. 1-10.

(Continued)

*Primary Examiner* — Jerome Grant, II
(74) *Attorney, Agent, or Firm* — Thompson Hine LLP

(57) ABSTRACT

Various implementations disclosed herein include devices, systems, and methods that involve federated learning techniques that utilize locally-determined ground truth data that may be used in addition to, or in the alternative to, user-provided ground truth data. Some implementations provide an improved federated learning technique that creates ground truth data on the user device using a second prediction technique that differs from a first prediction technique/model that is being trained. The second prediction technique may be better but may be less suited for real time, general use than the first prediction technique.

25 Claims, 7 Drawing Sheets

(56) References Cited

U.S. PATENT DOCUMENTS

2019/0141181 A1    5/2019  Wantland
2019/0171978 A1    6/2019  Bonawitz
2019/0229977 A1*   7/2019  Bisht .................. H04L 41/0645

OTHER PUBLICATIONS

Bakopoulou, Evita; Tillman, Balint and Markopoulou, Anthina: "A Federated Learning Approach for Mobile Packet Classification"; Unviersty of California, Irvine; arXiv:1907.13113v1 [cs.LG] Jul. 30, 2019, pp. 1-20.
"Amazon SageMaker Ground Truth", pp. 1-6; Dec. 2020.

* cited by examiner

FEDERATED LEARNING USING LOCAL GROUND TRUTH ESTIMATION

CROSS-REFERENCE TO RELATED APPLICATIONS

This Application claims the benefit of U.S. Provisional Application Ser. No. 62/951,532 filed Dec. 20, 2019, which is incorporated herein in its entirety.

TECHNICAL FIELD

The present disclosure generally relates to computer-implemented machine learning models such as neural networks, and in particular, to systems, methods, and devices that train or otherwise adjust a machine learning model that is distributed for use on multiple devices.

BACKGROUND

Federated learning techniques update centrally-stored machine learning models that are distributed for use on other devices. Updates for the machine learning model are generally identified on those other devices based on their local uses of a model, e.g., based on comparing the outputs of the models with expected results/ground truth on those other devices. The updates are provided back to the central device for use in updating the model. Existing federated learning techniques do not adequately create or identify ground truth data that can be used to determine the machine learning model updates. Existing techniques may be inefficient, infeasible, or inaccurate, for example, for computer vision and many other use cases in which ground truth data is not readily available.

SUMMARY

Federated learning involves various techniques used to update a centrally-stored and distributed machine learning model based on use of the model on other devices to which the machine learning model is distributed. For example, a central device may distribute a machine learning model to multiple devices that each use the machine learning model to make predictions (e.g., inferences) using data obtained at those devices. Each of the multiple devices assesses the predictions made by the model using locally-known data (e.g., ground truth data) and determines updates to the model accordingly. The updates may be sent to the central device, where the model is updated, and the updated version of the model may be redistributed to the multiple devices. Federated learning techniques may rely on user input to supply the ground truth data that is used to assess the local predictions made on the user devices. For example, a machine learning model may be trained to predict the characters that a user is about to type based on the characters that the user has already typed, e.g., as the user types the letters "he", the model may predict that the letters "llo" will be typed next. As the user continues typing, the user provides the ground truth data that can be used to assess the prediction, e.g., if the user continues to type the letters "llo," the model's predictions are confirmed or if the user continues to type the letters "ard," the model's predictions are not confirmed.

Implementations disclosed herein involve federated learning techniques that utilize locally-obtained ground truth data that may be used in addition to, or in the alternative to, user-provided ground truth data. Some implementations provide an improved federated learning technique that creates ground truth data on the user device using a second prediction technique that differs from the first prediction technique/model that is being trained. The second prediction technique may be better, e.g. more accurate or more robust, but may be less suited for real time, general use than the first prediction technique.

In some implementations, a method of federated learning is provided by executing instructions via a processor on a device, such as one of multiple devices (e.g., user devices) that use a machine learning model distributed by a central device (e.g., a host device). The method involves generating a first prediction using a first prediction technique and locally-obtained data. For example, the locally-obtained data may include an image captured by a camera on the device, auxiliary sensor data, user input, etc. The first prediction technique uses a first machine learning model that was distributed by a second device, e.g., a central device, to a plurality of devices. The method also obtains a second prediction based on locally-obtained data, for example, by generating a second prediction using a second prediction technique and the locally-obtained data. The second prediction technique may be more time-intensive, more processor intensive, use extra data from another sensor (e.g. a depth sensor), use extra data from the same sensor (e.g., prior images), or otherwise provide higher fidelity/accuracy than the first prediction technique. In another example, differences between a first prediction and a second prediction are a result of using transformations of the locally-obtained data as input to the first prediction technique and/or using transformations as input to a second prediction technique. For example, the first prediction technique may use input that includes a locally-obtained image with noise added and the locally-obtained image (e.g., the original, locally-obtained image without noise) may be used as the second prediction. In this example, the second prediction technique may be an identity function The method determines a machine learning model update (e.g., a gradient for use in updating a neural network) for the first machine learning model using the second prediction technique to provide ground truth. The machine learning model update may be determined based on the first prediction and the second prediction. For example, if both prediction techniques predict depth values for the pixels of an image (e.g., a light intensity/RGB image) captured at the device, the depth predictions of the second prediction technique may be considered the ground truth for the depth predictions of the first prediction technique. This characterization of the second prediction as appropriate ground truth data may be based on the second prediction technique being considered more accurate than the first prediction technique. Accordingly, differences between the predictions of the first prediction technique and the predictions of the second prediction technique may be used to determine an update to the first prediction technique, e.g., the difference may be used to determine a loss or a gradient for use in updating a neural network.

The method provides the machine learning model update to the second device, e.g., sending the gradient to the central device. The second device creates an updated machine learning model based on the machine learning model update and the updated machine learning model is redistributed to the plurality of user devices. In some implementations, the central device receives updates from many devices and updates the first machine learning model accordingly, e.g., so that the model is changed based on data obtained from multiple devices in a single update process.

The first prediction model may be updated using locally-obtained data from multiple other devices without requiring that the data used to determine those updates be shared with the second (e.g., central device) or any other device. The updates may include gradients or other information that is useable to directly update the first machine learning model without including the inputs (e.g., images captured by the users) used by either of the first or second prediction techniques, or predictions (e.g., predicted depth values for the pixels of the images) that were made by either of the first or second prediction techniques. The updates may exclude the locally-obtained data and/or the predictions of the locally-executed prediction techniques to preserve user privacy. The updates may be anonymous. In some implementations, noise is added to the updates before sending the updates to the second device and/or after receiving the updates on the second device for additional privacy of user data. These features may help protect the privacy of the users of the devices. For example, a first machine learning model that is used to predict depth values from images captured by user devices may be distributed and used by millions of users on their respective devices. These user devices may provide updates that make the first machine learning model better while safeguarding the privacy of the users, e.g., without the images captured by the users ever needing to be provided to the central device or any other device.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
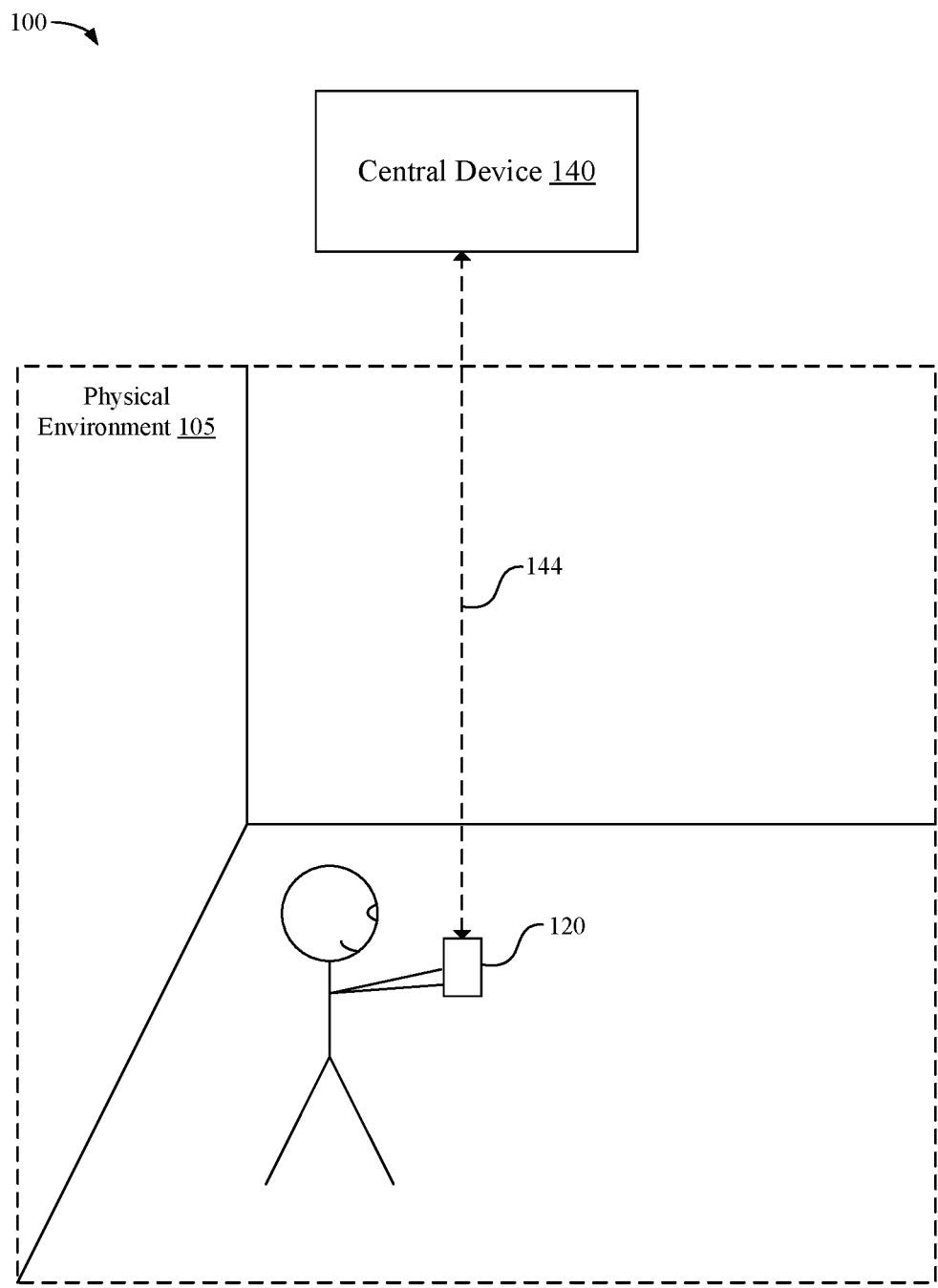
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Implementations disclosed herein update a centrally-stored and distributed machine learning model based on use of the model on other devices to which the machine learning model is distributed. Some implementations use a second prediction technique on the local (e.g., user) devices to identify ground truth data used by those local devices to determine updates to a first prediction technique—the centrally-stored and distributed machine learning model.

In one example, an initially-trained, centrally-stored first semantic segmentation model may be configured to identify semantic labels for pixels of images. This first model may be distributed to many mobile user devices that are able to use the first model locally to assess images captured by cameras on the respective devices. For example, a user may take a picture of his or her living room and see an annotated version of the image with labels identifying some of the objects in the living room. The annotations may be based on executing the first model on the image on the user's device, e.g., the first model provides the annotations as predictions. The device may also use the prediction made by the first model to identify an update for the model. To do so, ground truth data (e.g., correct or at least more accurate semantic labels) are needed so that the system can assess the accuracy of the first model's predictions and compute an update (e.g., by computing a loss and/or gradients of the network weights, e.g. by using a backpropagation algorithm). Some implementations determine the ground truth data using a more computationally/resource expensive or otherwise different second prediction technique than the first model. For example, the second prediction technique may be an image analysis technique that is too processor/storage intensive to feasibly be executed on every frame of video being captured of the user's living room but may be run on every $60^{th}$ frame or every $600^{th}$ frame, etc. The output of the second prediction technique may provide semantic label predictions for an image of the user's living room that are more accurate than the predictions made by the first model. These predictions may be used as ground truth data to train the first model in a federated fashion, e.g., providing a federated, teacher-student training process.

In another example, if the predictions are providing depth estimations for images, the first prediction technique may be a computer vision machine learning model executed on every frame of a video while the second prediction technique/ground truth generator may be a depth camera that is turned on periodically to obtain depth data for only a small subset of the frames of the video. The depth camera ground truth data may be compared with the first prediction technique's predictions to determine updates that are provided back to the central device that updates and re-distributes the model. These examples are provided to introduce the subject matter of some implementations and should not be interpreted as providing limitations on the various and general federated learning techniques that are disclosed herein.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a central device 140 and one or more other devices, such as device 120.

In some implementations, the central device 140 is configured to manage and coordinate initiation, updating, and distribution of a distributed first prediction technique (e.g., a machine learning model). In some implementations, the central device 140 includes a suitable combination of software, firmware, and/or hardware. The central device 140 is described in greater detail below with respect to FIG. 5. In this example, the central device 140 is a remote server located outside of the physical environment 105 (e.g., a cloud server, etc.). In some implementations, the central device 140 is communicatively coupled with the device 120 via one or more wired or wireless communication channels 144.

In some implementations, the device 120 is configured to use the first prediction technique (e.g., the machine learning model), use a second prediction technique, and identify updates to the first prediction technique based on local (e.g., on device 120) predictions made by the first prediction technique and the second prediction technique. In some implementations, the device 120 includes a suitable combination of software, firmware, and/or hardware. The device 120 is described in greater detail below with respect to FIG. 4.

Figure 2:
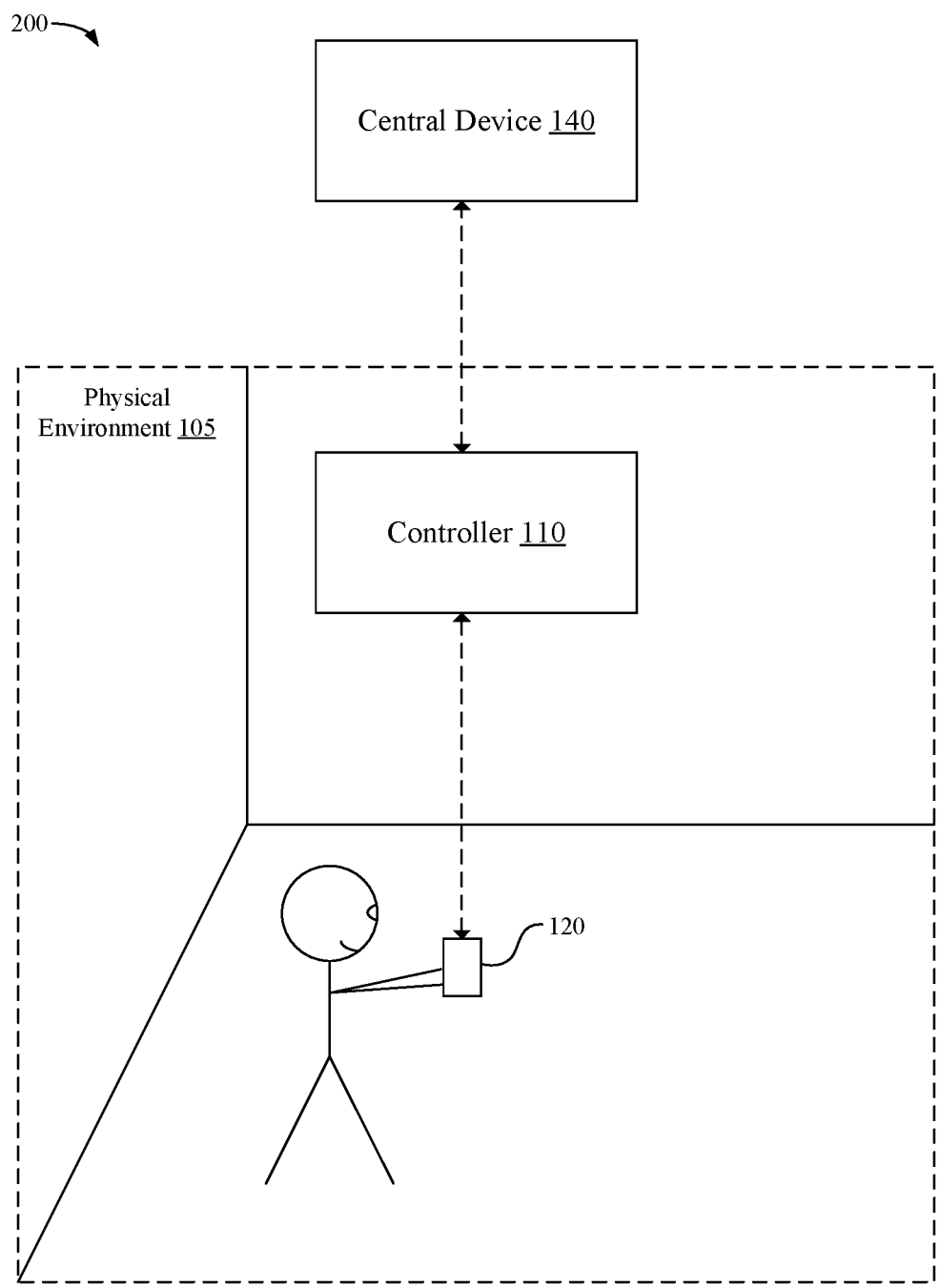
FIG. 2 is a block diagram of another example operating environment in accordance with some implementations.

FIG. 2 is a block diagram of another example operating environment 100 in accordance with some implementations. To that end, as a non-limiting example, the operating environment 200 includes a central device 140, a controller 110, and a device 120. In this example, the central device 140 is configured similarly to the central device of FIG. 1, e.g., being configured to manage and coordinate initiation, distribution, and application of updates to a distributed first prediction technique (e.g., a machine learning model). In some implementations, the central device 140 is communicatively coupled with the controller 110 which is itself communicatively coupled to device 120 via one or more wired or wireless communication channels.

In the example of FIG. 2, both the device 120 and the controller 110 are within the possession or control of a user. Accordingly, user data may be on one or both of the device 120 and the controller 110 but may be restricted from being provided to external, non-user devices such as central device 140. In one implementation, device 120 is a mobile device, wearable device, head-mounted device (HMD), laptop or personal computer device and controller 110 is another mobile device, wearable device, head-mounted device (HMD), laptop or personal computer device, or server and the user information and locally-obtained data is shared between the device 120 and the controller 110. In some implementations, a machine learning model is used by a user using one or both of device 120 and controller 110 on locally-obtained data and one or both of device 120 and controller 110 are used to determine an update for the machine learning model according to techniques disclosed herein.

In some implementations, the controller 110 is configured to manage and coordinate an experience for the user of the device 120. In some implementations, the controller 110 includes a suitable combination of software, firmware, and/or hardware. The controller 110 is described in greater detail below with respect to FIG. 3. In some implementations, the controller 110 is a computing device that is local or remote relative to the physical environment 105. In one example, the controller 110 is located within the physical environment 105. In another example, the controller 110 is located outside of the physical environment 105. In some implementations, the functionalities of the controller 110 are provided by and/or combined with the device 120.

According to some implementations (e.g., in the operating environments of FIG. 1, FIG. 2, and other environments), the device 120 presents a computer-generated reality (CGR) environment to the user while the user is in the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. In some implementations, the image data is pixel-registered with the images of the physical environment 105 (e.g., RGB, depth, and the like) that is utilized with the image processing techniques within the CGR environment described herein.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, the user wears the device 120 on his/her head. As such, the device 120 may include one or more displays provided to display content. For example, the device 120 may enclose the field-of-view of the user. In some implementations, the device 120 is a handheld electronic device (e.g., a smartphone or a tablet) configured to present content to the user. In some implementations, the device 120 is replaced with a chamber, enclosure, or room configured to present content in which the user does not wear or hold the device 120.

Figure 3:
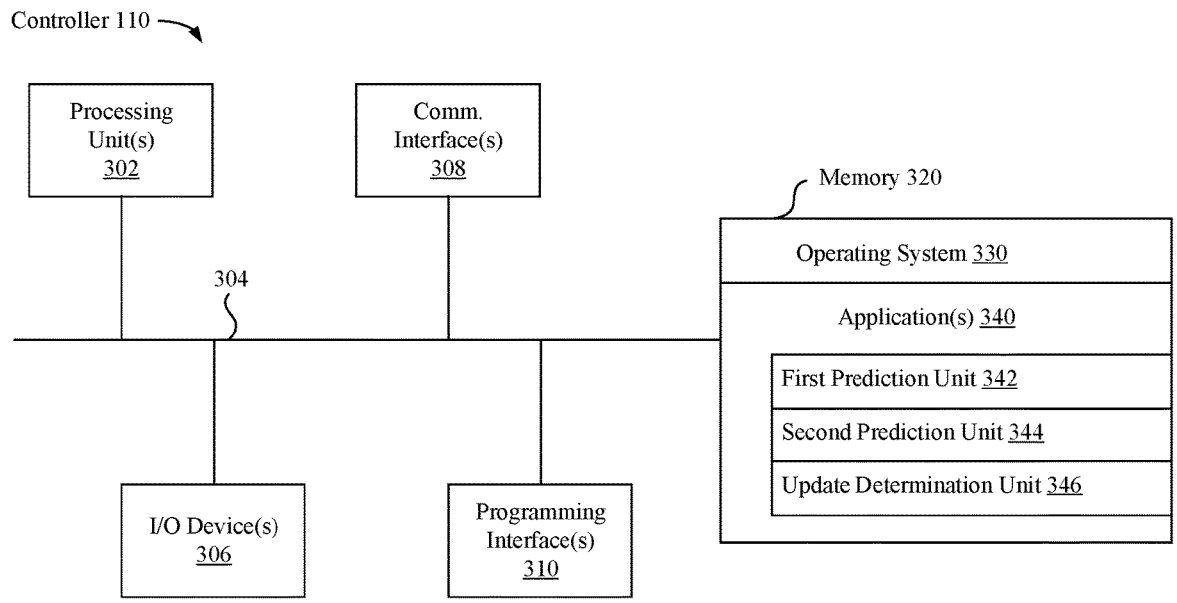
FIG. 3 is a block diagram of an example controller in accordance with some implementations.

FIG. 3 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 302 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 306, one or more communication interfaces 308 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 310, a memory 320, and one or more communication buses 304 for interconnecting these and various other components.

In some implementations, the one or more communication buses 304 include circuitry that interconnects and controls communications between system components. In some implementations, the one or more I/O devices 306 include at least one of a keyboard, a mouse, a touchpad, a joystick, one or more microphones, one or more speakers, one or more image sensors, one or more displays, and/or the like.

The memory 320 includes high-speed random-access memory, such as dynamic random-access memory (DRAM), static random-access memory (SRAM), double-data-rate random-access memory (DDR RAM), or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and one or more applications 340.

The operating system 330 includes procedures for handling various basic system services and for performing hardware dependent tasks. In some implementations, the operating system 330 includes built in CGR functionality, for example, including a CGR environment application or viewer that is configured to be called from the one or more applications 340 to display a CGR environment within a user interface. In some implementations, the applications 340 are configured to manage and coordinate one or more experiences for one or more users (e.g., a single experience for one or more users, or multiple experiences for respective groups of one or more users).

The applications 340 include a first prediction unit 342, a second prediction unit 344, and an update determination unit 346. The first prediction unit 342 may be configured to receive information (e.g., images, text, audio, input, sensor data, etc. received from the device 120) and provide a first prediction. The first prediction unit 342 may be configured to provide such a prediction using a machine learning model distributed by central device 140. The second prediction unit 344 may be configured to receive the same information (e.g., images, text, audio, input, sensor data, etc. from the device 120) and provide a second prediction. The second prediction unit 344 may use additional information, different information, information from additional sensors or devices, and/or use additional or different resources to provide the second prediction than are used by the first prediction unit 342 to provide the first prediction. The update determination unit 346 may be configured to compare a first prediction provided by the first prediction unit 342 with a second prediction provided by the second prediction unit 344 to determine an update to the machine learning model used by the first prediction unit 342. The controller 110 may be configured to provide such updates to the central device 140.

FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
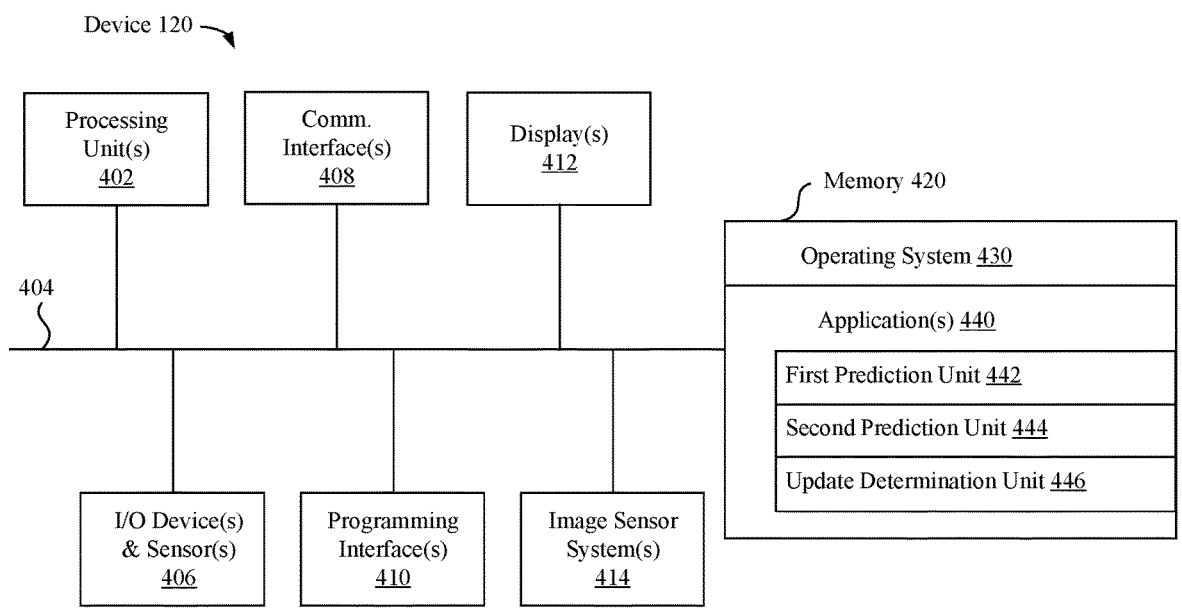
FIG. 4 is a block diagram of an example device in accordance with some implementations.

FIG. 4 is a block diagram of an example of the device 120 (e.g., a user device) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 402 (e.g., microprocessors, ASICs, FPGAs, GPUs, CPUs, processing cores, and/or the like), one or more input/output (I/O) devices and sensors 406, one or more communication interfaces 408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 410, one or more displays 412, one or more interior and/or exterior facing image sensor systems 414, a memory 420, and one or more communication buses 404 for interconnecting these and various other components.

In some implementations, the one or more communication buses 404 include circuitry that interconnects and controls communications between system components. In some implementations, the one or more I/O devices and sensors 406 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 412 are configured to present the experience to the user. In some implementations, the one or more displays 412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 412 correspond to diffractive, reflective, polarized, holographic, etc. waveguide displays. For example, the device 120 includes a single display. In another example, the device 120 includes a display for each eye of the user.

In some implementations, the one or more image sensor systems 414 are configured to obtain image data that corresponds to at least a portion of the physical environment 105. For example, the one or more image sensor systems 414 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 414 further include illumination sources that emit light, such as a flash. In various implementations, the one or more image sensor systems 414 further include an on-camera image signal processor (ISP) configured to execute a plurality of processing operations on the image data including at least a portion of the processes and techniques described herein.

The memory 420 includes high-speed random-access memory, such as DRAM, SRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and one or more applications 440.

The operating system 430 includes procedures for handling various basic system services and for performing hardware dependent tasks. In some implementations, the operating system 430 includes built in CGR functionality, for example, including an CGR environment application or viewer that is configured to be called from the one or more applications 440 to display a CGR environment within a user interface. In some implementations, the applications 440 are configured to manage and coordinate one or more experiences for one or more users (e.g., a single experience for one or more users, or multiple experiences for respective groups of one or more users).

The applications 440 include a first prediction unit 442, a second prediction unit 444, and an update determination unit 446. The first prediction unit 442 may be configured to receive information (e.g., images, text, audio, input, sensor data, etc.) via local sensors or input devices and provide a first prediction. The first prediction unit 442 may be configured to provide such a prediction using a machine learning model distributed by central device 140. The second prediction unit 444 may be configured to receive the same information (e.g., images, text, audio, input, sensor data, etc.) and provide a second prediction. The second prediction unit 444 may use additional information, different information, information from additional sensors or devices, and/or use additional or different resources to provide the second prediction than are used by the first prediction unit 442 to provide the first prediction. The update determination unit 446 may be configured to compare a first prediction provided by the first prediction unit 442 with a second prediction provided by the second prediction unit 444 to determine an update to the machine learning model used by the first prediction unit 442. The device 120 may be configured to provide such updates to the central device 140.

Although these elements are shown as residing on a single device (e.g., the device 120), it should be understood that in other implementations, any combination of the elements may be located in separate computing devices. Moreover, FIG. 4 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., applications 440) shown separately in FIG. 4 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 5:
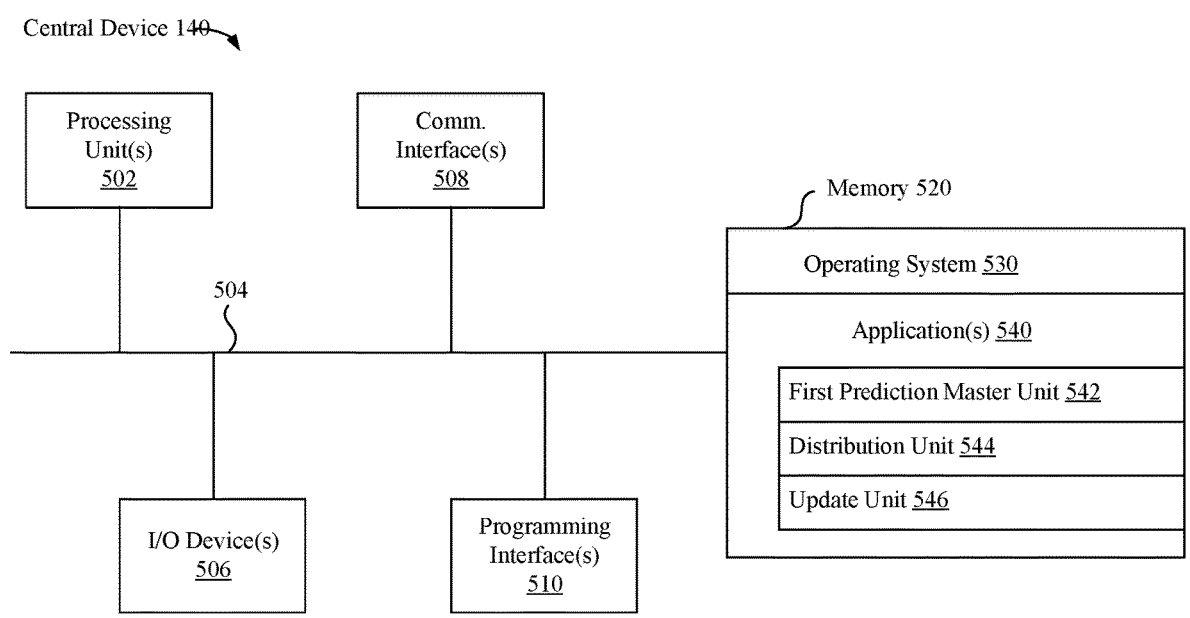
FIG. 5 is a block diagram of an example central device in accordance with some implementations.

FIG. 5 is a block diagram of an example of the central device 140 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the central device 140 includes one or more processing units 502 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 506, one or more communication interfaces 508 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 510, a memory 520, and one or more communication buses 504 for interconnecting these and various other components.

In some implementations, the one or more communication buses 504 include circuitry that interconnects and controls communications between system components. In some implementations, the one or more I/O devices 506 include at least one of a keyboard, a mouse, a touchpad, a joystick, one or more microphones, one or more speakers, one or more image sensors, one or more displays, and/or the like.

The memory 520 includes high-speed random-access memory, such as dynamic random-access memory (DRAM), static random-access memory (SRAM), double-data-rate random-access memory (DDR RAM), or other random-access solid-state memory devices. In some implementations, the memory 520 includes non-volatile memory, such as one or more magnetic disk storage devices, optical disk storage devices, flash memory devices, or other non-volatile solid-state storage devices. The memory 520 optionally includes one or more storage devices remotely located from the one or more processing units 502. The memory 520 comprises a non-transitory computer readable storage medium. In some implementations, the memory 520 or the non-transitory computer readable storage medium of the memory 520 stores the following programs, modules and data structures, or a subset thereof including an optional operating system 530 and one or more applications 540.

The operating system 530 includes procedures for handling various basic system services and for performing hardware dependent tasks. In some implementations, the operating system 530 includes built in CGR functionality, for example, including a CGR environment application or viewer that is configured to be called from the one or more applications 540 to display a CGR environment within a user interface. In some implementations, the applications 540 are configured to manage and coordinate one or more experiences for one or more users (e.g., a single experience for one or more users, or multiple experiences for respective groups of one or more users).

The applications 540 include a first prediction master unit 542, a distribution unit 544, and an update unit 546. The first prediction master unit 542 may be configured to initialize and/or store a master/current version of a first prediction unit/machine learning model. The distribution unit 544 may be configured to distribute the first prediction unit/machine learning model to multiple other devices such as to controller 110 or device 120. The distribution unit 544 may be configured to distribute the first prediction unit/machine learning model according to distribution criteria, e.g., based on the passage of a threshold amount of time since the last distribution, receipt of a threshold number of updates, etc. The update unit 546 may be configured to apply one or more updates received from devices that use the first prediction unit/machine learning mode, e.g., updates from the controller 110 or device 120. The update unit 546, for example, may apply a gradient received from device 120 to update a machine learning model stored in the first prediction master unit 542. The update unit 546 may use a gradient descent optimization technique/algorithm, machine learning model optimizer, or method for stochastic optimization, e.g. stochastic gradient descent, Momentum, Adam, Adagrad, AMSGrad, AdaMax, Nadam, RMSprop, or any other appropriate updating technique.

FIG. 5 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 6:
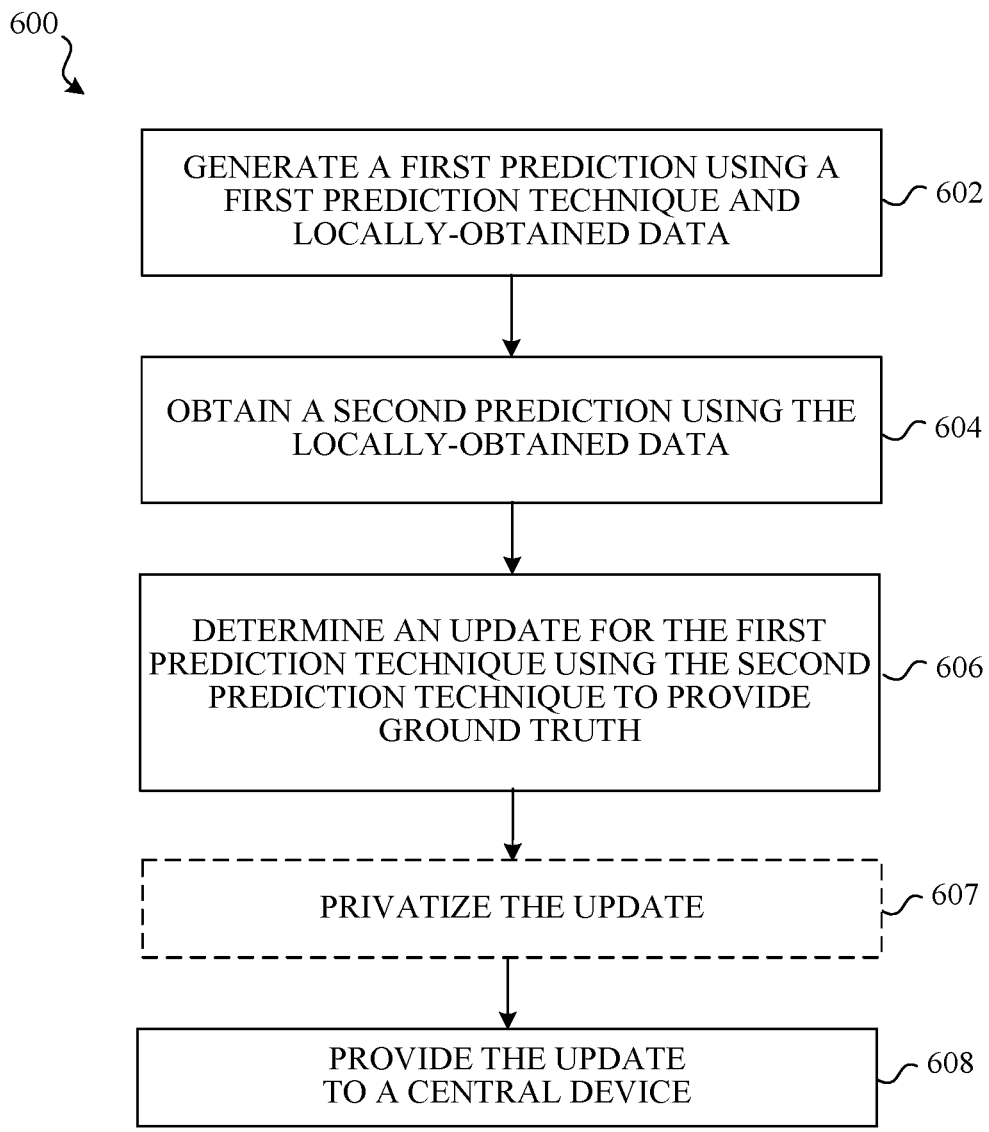
FIG. 6 is a flowchart representation of an exemplary federated learning technique for updating a machine learning model.

FIG. 6 is a flowchart representation of an exemplary federated learning technique for updating a machine learning model. In some implementations, the method 600 is performed on a device (e.g., device 120 of FIGS. 1, 2, and 4) such as a mobile device, wearable device, head-mounted device (HMD), desktop, or laptop that includes cameras, sensors, and input devices used to provide local data for the training of the machine learning model. In some implementations, the method 600 is performed on a device (e.g., controller 110 of FIGS. 2 and 3), such as a mobile device, desktop, laptop, or server device that is used in combination with a device that includes cameras, sensors, and input devices used to provide local data for the training of the machine learning model. In some implementations, the method 600 is performed by processing logic, including hardware, firmware, software, or a combination thereof. In some implementations, the method 600 is performed by a processor executing code stored in a non-transitory computer-readable medium (e.g., a memory).

At block 602, the method 600 generates a first prediction using a first prediction technique and locally-obtained data (e.g., using an image captured by a camera on the device, sensor data, user input, etc.). The first prediction technique uses a first machine learning model that is distributed and redistributed after updating by another device, e.g., a second device, to a plurality of user devices. For example, a central device 140 may distribute the machine learning model to the controller 110 or device 120 and other devices that will utilize the machine learning model using their own locally-obtained data. The first prediction may be generated using the first prediction technique using the locally-obtained data or a transformed version of the locally-obtained data as input.

At block 604, the method 600 obtained a second prediction using the locally-obtained data. The second prediction may be locally-obtained data, locally-obtained data with one or more transformations applied, the parameters of a transformation that has been applied to locally-obtained data, or generated using a second prediction technique using the locally-obtained data or a transformed version of the locally-obtained data as input. The second prediction technique may be more time-intensive, more processor-intensive, more power-intensive, use extra data from another sensor (e.g. a depth sensor), use extra data from the same sensor (e.g., prior images), or otherwise provide higher fidelity/accuracy or otherwise be different than the first prediction technique.

In some implementations, the first prediction technique is a machine learning model configured to estimate an image characteristic of an image of the physical environment proximate to the electronic device without using data from a non-image sensor and the second prediction technique is configured to estimate the image characteristic using the data from the non-image sensor.

In some implementations, the first prediction technique is a machine learning model configured to estimate pixel depths using a monocular image of a physical environment proximate the electronic device and the second prediction technique is configured to estimate the pixel depths using data from depth camera (e.g., using structured light or time of flight depth camera).

In some implementations, the first and second prediction techniques perform a computer vision task such as, but not limited to, semantic segmentation, content hallucination, object detection, object identification, or plane estimation.

In some implementations, the first prediction technique is a machine learning model configured to perform a computer vision task using a single image of a physical environment proximate the electronic device and the second prediction technique is configured to perform the computer vision task using multiple of images of the physical environment proximate the electronic device. The multiple images may include images corresponding to different times of day, different lighting conditions, or different viewpoints of the physical environment than the image used by the first prediction technique.

In some implementations, the first prediction technique is a machine learning model configured to recognize speech using only audio data and the second prediction technique is configured to recognize speech using audio data and image data (e.g., being configured to read lips based on the image data).

In some implementations, the first prediction technique is a machine learning model configured to perform a task without performing an iterative simulation or optimization and the second prediction technique is configured to perform the task using the iterative simulation or optimization. In some implementations, for example, given two images of a planar object, such as a book cover, the objective of the prediction technique may be to determine a perspective homography that aligns the book cover in the first image with the book cover in the second image. The first prediction technique may be a machine learning model, such as an artificial neural network that, given two images as input estimates an eight-dimensional vector representing the eight degrees of freedom of a perspective homography as an output. The second prediction technique may use methods including keypoint matching, closed-form homography estimation methods based on keypoint matches, or image alignment methods based on iterative (non-linear) optimization, such as inverse compositional image alignment, forward compositional image alignment, or efficient second order minimization. In other implementations, the first and second prediction techniques may predict the pose of an articulated object. While the first prediction technique may be implemented as a machine learning model, i.e., artificial neural network, the second prediction technique may be implemented using a simulation technique, such as inverse kinematics or finite element method.

In some implementations, the first prediction technique is a machine learning model configured to perform a task without data from a third device in the same physical environment as the electronic device and the second prediction technique is configured to perform the task using the data from the third device. For example, the first device may be a mobile device that the user is using to capture images that are used to identify items and spatial positions of the items in the user's physical environment. The first prediction technique may make these item and position predictions using only the images captured by the user's mobile device while the second prediction technique may additionally or alternatively use images captured by the user's laptop camera, security camera, and/or other devices within the control or access of the user that can provide additional data about the user's physical environment that facilitate the predictions.

In some implementations, the first prediction technique is a machine learning model configured to determine location based on an image (e.g., determining the user's location based on detecting the Eiffel tower in an image captured by the user's device and determining the user's position and orientation based on the image relative to the Eiffel tower in the image). In this example, the second prediction technique may be configured to determine the location based on global positioning system (GPS) data, other location beacons such as WIFI signals, Bluetooth fingerprints, or movement sensor data (e.g., determining the position and orientation based on GPS, accelerometer data, a simultaneous localization and mapping (SLAM) technique, etc.)

In some implementations, the second prediction technique uses information that is obtained after the information used by the first prediction technique. For example, the first prediction technique may use a first input image as input (e.g., an image that is received and displayed in real time during a user session or experience) while the second prediction technique may use a second image that is obtained at a later time (e.g., after the user session or experience). In one example, an image is captured at time T1 and kept in memory. More images are captured after T1, e.g., at T2. The first prediction technique is fed the image from T1 (e.g., an old image) and the second prediction technique is fed the images from both T1 and T2 allowing the second prediction technique to generate a better prediction than would have been possible with the information (image) available at T1. This better prediction is then used as the ground truth. Essentially such techniques effectively use information "from the future" for ground truth.

In some implementations, the second prediction technique is a machine learning model, such as an artificial neural network. In some implementations, the second prediction technique not only provides a final prediction (e.g. the activations of the output layer) but also internal intermediate state (e.g. the activations of hidden layers) to supervise the training of the first prediction technique performing what is commonly known as knowledge distillation. In such implementations, the update (e.g. gradient) to the first prediction technique is determined based on not only the (difference between the) second prediction and the first prediction but additionally based on the (difference between the) internal intermediate state of the second prediction technique and an internal intermediate state of the first prediction technique.

In some self-supervised learning implementations, the ground truth data may come directly or indirectly from the locally-obtained data. In some self-supervised learning implementations, the locally-obtained data may be limited or altered before being evaluated by the first machine learning model at block 602. In one example, the locally-obtained data is an image, only a portion of that image (e.g., with other portions masked out) is input to the first prediction technique, and the first prediction technique is trained to predict the missing portions of the inputted image. In this example, the second prediction technique can involve identifying ground truth data based on the original/complete locally obtained data, e.g., identifying the entire image without the other portions masked out. In this example, the second prediction technique may be an identity function that outputs its inputs. In another example, the locally-obtained data is an image, multiple portions (e.g., patches) of that image are input to the first prediction technique, and the first prediction technique is trained to predict a spatial relationship between those portions. In this example, the second prediction technique can involve identifying ground truth data based on the transforms applied to extract the portions, whereas the transforms are fed as input into the second prediction technique and the second prediction technique is outputting the transforms e.g., identifying the spatial relationship between the portions using the entire image including identifications of the portions and their respective coordinates, centers, etc. In some embodiments, the second prediction technique is an identity function that outputs its inputs.

In another self-supervised learning implementation, the locally-obtained data is altered before being input to the first prediction technique. In one example, the locally-obtained data is an image, the image is rotated, blurred, upscaled, with modified brightness, and/or with added noise before being input to the first prediction technique, and the first prediction technique is trained to undo the alterations, e.g., to produce something as similar as possible to the original image. In this example, the second prediction technique can involve identifying ground truth data based on the original/complete locally obtained data, e.g., the unaltered image. For example, the second prediction technique is an identity function that outputs its inputs.

In another self-supervised learning implementation, the first prediction technique is an autoencoder, which is trained to encode its input into a latent representation (which for example may be much lower dimensional than the input data) and to then decode that latent representation into the original data, e.g. the input data. In some embodiments the first prediction technique is trained to produce as prediction something as similar as possible to the original image. In this example, the second prediction technique can involve identifying ground truth data based on the original locally obtained data, e.g., the original image. For example, the second prediction technique is an identity function that is provided with the original image as input and provides the original image as output.

At block 606, the method 600 determines an update (e.g., a gradient for a neural network-based machine learning model) for the first prediction technique (e.g., for a first machine learning model) using the second prediction technique to provide ground truth. For example, a machine learning model update may be determined based on the first prediction and the second prediction (e.g., based on determining the difference between the predictions or a loss otherwise determined based on the predictions and using the difference or other loss to determine a gradient, e.g. using backpropagation).

In some implementations, at block 607 privatization of updates (i.e., adding noise to them to preserve user privacy) is optionally performed. For example, a distributed DP process may be performed to add noise to the model updates before sending them back to ensure, for example, that the gradients cannot be used to reconstruct the data that was used to compute them. In some implementations, noise is added to the updates before sending the updates to the second device for additional privacy of user data. In some implementations, noise is added to the gradients after they have been received by the second device and before and/or after they are being aggregated. The noise that is added can be of various distributions e.g., Uniform, Gaussian, Normal, Laplacian. The characteristics of the noise (such as mean, variance, etc.) can be determined based on the computed gradients, the number of gradients being aggregated and/or other factors.

At block 608, the method 600 provides the update (e.g., a machine learning model update) to a central device, e.g., to a second device that maintains and distributes the machine learning model. The update may exclude the locally-obtained data and/or exclude the actual predictions of the locally-executed prediction techniques to preserve user privacy. Updates may be anonymous, e.g., including no information that identifies the locally-obtained data, the device(s) that obtained the locally-obtained data, the device(s) that determined the update, the user(s) or owner(s) of the device(s) that obtained the locally-obtained data and/or determined the update, the locations of the user(s) or device(s) involved in obtaining the locally-obtained data and/or determining the update.

The central device that receives the update (e.g., a second device that receives a machine learning model update) creates an updated first prediction technique (e.g., an updated machine learning model) based on the update. For example, a central device may update the machine learning model based on a gradient provided by the method 600. A central device may employ a gradient descent optimization technique/algorithm, machine learning model optimizer, or method for stochastic optimization, e.g. stochastic gradient descent, Momentum, Adam, Adagrad, AMSGrad, AdaMax, Nadam, RMSprop to update the first prediction technique.

In some implementations, the central device applies updates to first prediction technique using update criteria. For example, the central device may implement a process that prevents updating the first prediction technique based on updates from only a small number of users. For example, the central device may require updates from at least a predetermined or otherwise fixed number of users to further increase user data privacy.

The central device that receives the update (e.g., a second device that receives a machine learning model update) may create an updated first prediction technique (e.g., an updated machine learning model) and provide the updated first prediction technique to the plurality of devices. In some implementations, the central device receives updates from many user devices and updates the technique/model accordingly. In some implementations, the central device is configured to receive machine learning model updates from multiple devices of a plurality of users or updates from multiple devices of a plurality of user devices, create an updated machine learning model based on the machine learning model updates (e.g., using accumulation via average, weighted average, etc.), and distribute the updated machine learning model to the plurality of user devices.

Figure 7:
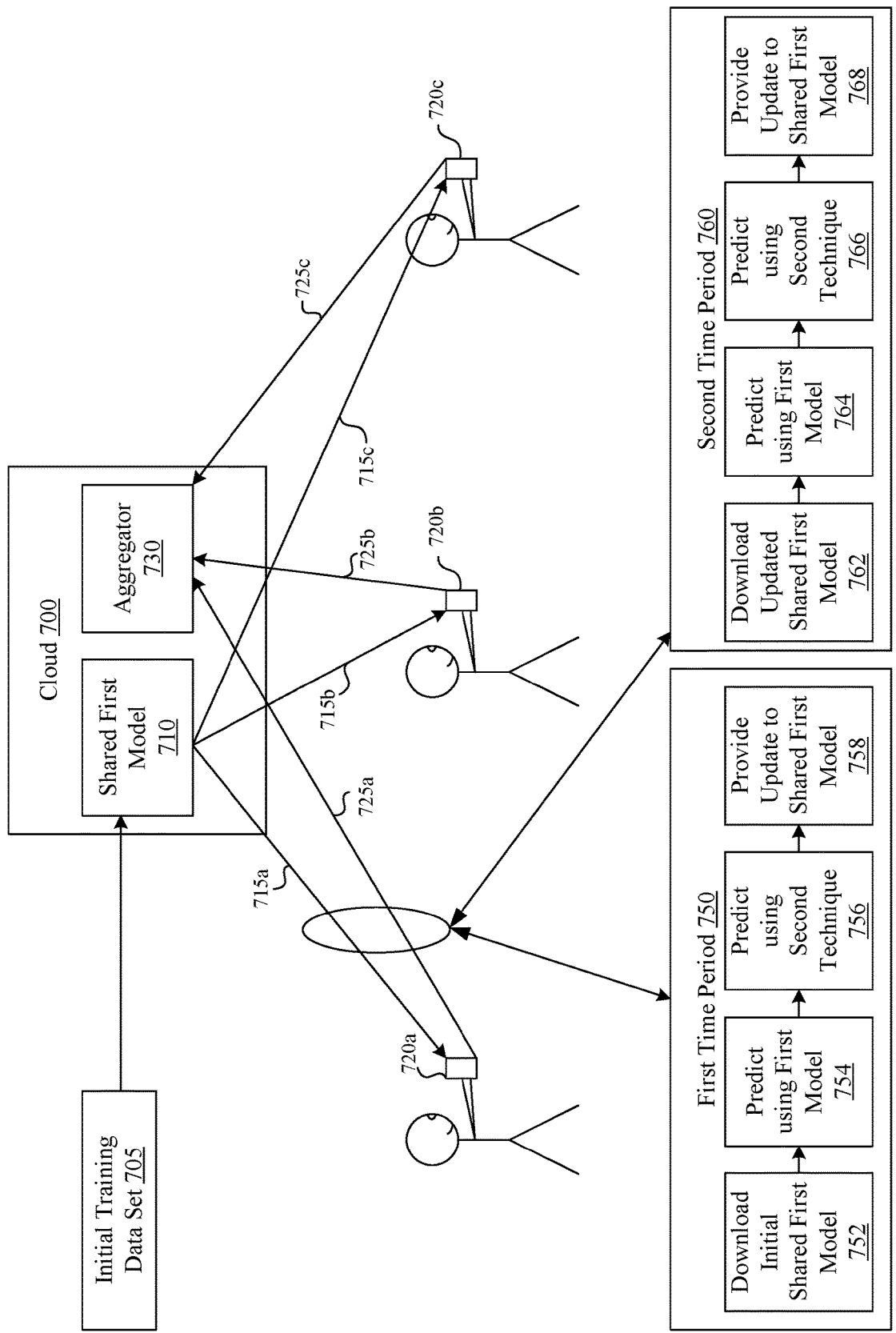
FIG. 7 is a block diagram illustrating an example of a federated learning technique for updating a machine learning model.

FIG. 7 is a block diagram illustrating an example of a federated learning technique for updating a machine learning model. Federated learning may enable distributed devices (e.g., hundreds, thousands, millions, etc.), to collaboratively train a shared machine learning model while keeping locally-obtained and generated training data local on the devices. In this example, the federated learning approach includes a cloud or cloud server 700 having a shared first model 710. The shared first model 710 may be initially built based on an initial training data set 705 provided from one or more data sources. The initial training data set 705 may include real (e.g., user-based) or synthetic data that is generated manually, semi-automatically, or automatically.

In this example, each individual device 720*a-c* first downloads the current model 715*a-c* from the cloud 700, determines updates for the model using its own locally-obtained data, and provides the updates 725*a-c* back to the cloud 700. In an example, in a first time period 750, device 720*a* downloads the initial model at block 752. Local data may be collected via a camera, sensors, user input, or otherwise on the device 720*a*. The device 720*a* uses the model to make a first prediction at block 754 and uses a second technique to make a second prediction at block 756. At block 758, the device 720*a* provides an update to the shared first model based on the first prediction and the second prediction, for example, using the second prediction as ground truth data to determine an appropriate update based on the first prediction's inaccuracy relative to that ground truth. The update may be privatized, for example, via optional noise addition modules in the device 720*a* or in the cloud 700. The learning result may be summarized as a model update. In some implementations, only the update, rather than the entire set of local learning data, is uploaded back to the cloud 700 with encrypted communication to protect security and privacy. The cloud 700 may include an aggregator 730 to combine updates from a large set of devices 720*a-c* to improve the shared first model 710.

The process may be performed dynamically, e.g., each individual device 720*a-c* may reload the updated shared first model 710 from the cloud 700 periodically and start the same workflow again. For example, in a second time period

760, device 720*a* downloads the updated model at block 762. Local data may again be collected via a camera, sensors, user input, or otherwise on the device 720*a*. The device 720*a* uses the model to make a first prediction at block 764 and uses a second technique to make a second prediction at block 766. At bock 768, the device 720*a* provides another update to the shared first model based on the first prediction and the second prediction, for example, using the second prediction as ground truth data to determine an appropriate update based on the first prediction's inaccuracy relative to that ground truth. The update may be privatized, for example, via optional noise addition modules in the device 720*a* or in the cloud 700. The learning result may be summarized as another model update and the cloud 700 may use the aggregator 730 to combine the update and other additional updates from the devices 720*a-c* to further improve the shared first model 710.

On the devices 720*a-c*, updates may be determined as the devices 720*a-c* are used in real use cases by their users. Accordingly, one benefit of the techniques illustrated in some implementations herein is that a machine learning model is updated using real, current user data, in real circumstances, and from a variety of different users and user devices. The models that are trained may accordingly be more accurate, adaptive, and useful to their users.

Techniques for Using Second Predictions that Differ from First Predictions

In some implementations, a first prediction technique receives as input a degraded version of locally-obtained data, while a second prediction is obtained from the original (e.g., complete or un-degraded) locally-obtained data. In one example, the objective is to train an image classifier (e.g., the first prediction technique) and that classifier should work well on noisy images. To do so, in some implementations, local image data that is not very noisy is obtained, noise is added to that local image data, and the transformed/noisy image data is provided as input to the first prediction technique while the original (less noisy) version as input is used as the ground truth for training the first prediction technique. In another example, the original (less noisy) version is provided as input to a second prediction technique that produces the ground truth used for training the first prediction technique. In this example, the second prediction technique may be an identity function. One advantage of this scenario is that the second prediction technique receives better input and therefore can make a better prediction than the first prediction technique, which can thus be trained based on the output of the second prediction technique.

In another example, the image input to a first prediction technique may be degraded or otherwise transformed, e.g. down-sampled, converted from color to grayscale, blurred, reduced in bit depth, etc.

Figure 8:
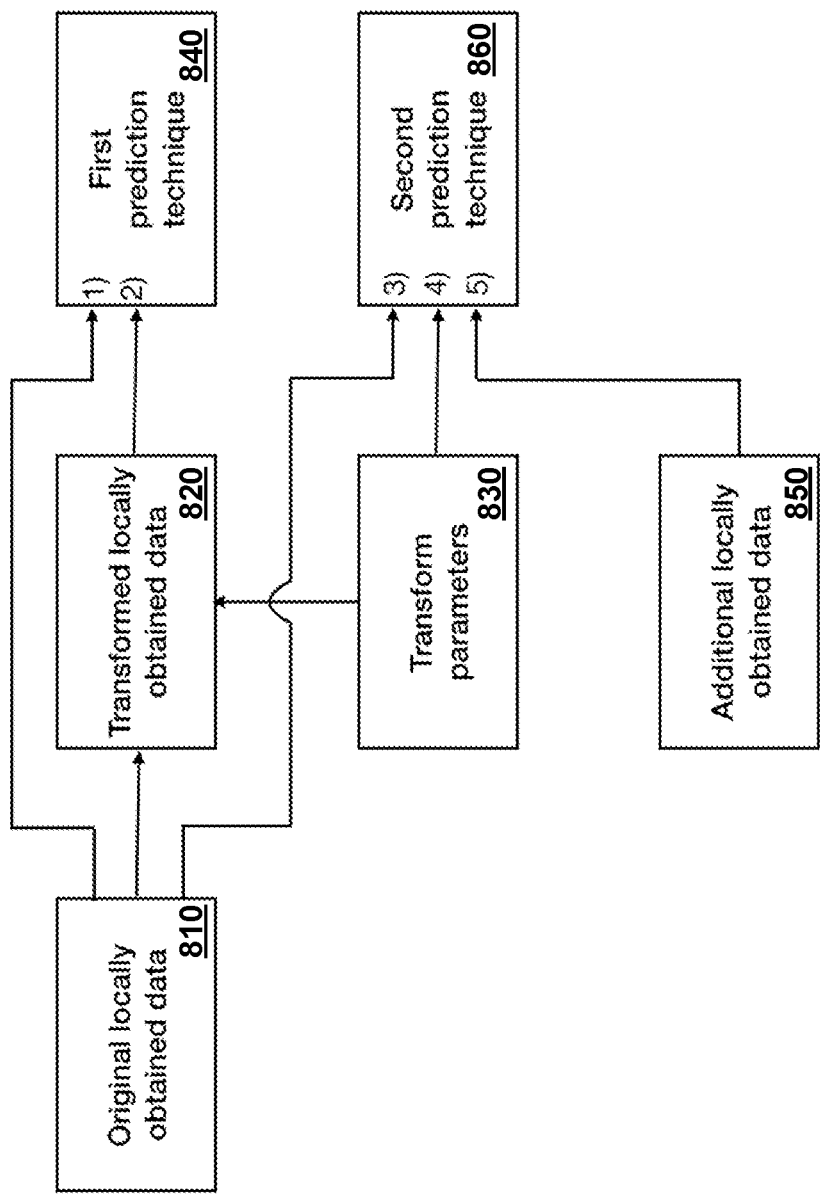
FIG. 8 is a block diagram illustrating another example of a federated learning technique for updating a machine learning model.

FIG. 8 is a block diagram illustrating another example of a federated learning technique for updating a machine learning model. In this example, original locally-obtained data 810 is transformed into transformed locally-obtained data 820 using transform parameters 830. The original locally-obtained data 810 or the transformed locally-obtained data 820 may be used as input to a first prediction technique 840 to make a first prediction. One or more of the original locally-obtained data 810, the transform parameters 830 and additional locally-obtained data 850 may be input to a second prediction technique 860 to generate a second prediction that can be used to evaluate or train the first prediction technique 840.

Various implementations can be implemented using one or more of the features illustrated in FIG. 8.

In one implementation in which the second prediction technique 860 is more robust/powerful than the first prediction technique, e.g., using more capacity, slower optimization-based methods, etc., the input to each of the first prediction technique 840 and the second prediction technique 860 may be only the original locally-obtained data 810 (e.g., inputs 1 and 3).

In another implementation in which the second prediction technique 860 uses additional data, e.g., a depth map in addition to an RGB image, the input to the first prediction technique 840 is the original locally-obtained data 810 (input 1), e.g., the RGB image, and the inputs to the second prediction technique are the original locally-obtained data 810 (input 3), e.g., the RGB image, and the additional locally-obtained data 850 (input 5), e.g., the depth map.

In another implementation, the second prediction is original data and the first prediction technique 840 inputs degraded data, e.g. the first prediction technique may learn image classification on noisy images. In this example, the input to the first prediction technique 840 is the transformed locally-obtained data 820 (input 2), e.g., a degraded image, and the second prediction is the original locally-obtained data 810. In this case, the second prediction technique might be an identity function that takes as input 3 the original locally-obtained data 810 and outputs the same original locally-obtained data 810 as prediction. In another example, the input to the first prediction technique 840 is the transformed locally-obtained data 820 (input 2), e.g., a degraded image, and the input to the second prediction technique 860 is the original locally-obtained data 810 (input 3). In this example, the transform may be degradation, e.g., noise, and the first prediction technique is trained to predict something that is not just the original locally-obtained data 810, but e.g. an image classification task, and in such example the second prediction technique also makes predictions for the same task, e.g. image classification.

In another implementation, the second prediction technique 860 uses original data (810) and additional data (850) and the first prediction technique 840 uses degraded data (820), e.g., a first predictor may learn image classification on noisy images and the second predictor additionally uses a depth map to perform image classification resulting in predictions of higher accuracy than those of the first prediction technique. In this example, the input to the first prediction technique 840 is the transformed locally-obtained data 820 (input 2), e.g., a degraded image, and the input to the second prediction technique 860 is the original locally-obtained data 810 (input 3) and additional locally obtained data 850 (input 5).

In another implementation, the first prediction technique 820 uses degraded data and learns to estimate original data, training a denoising or hole-filling/inpainting network. In one example, the input to the first prediction technique 840 is the transformed locally-obtained data 820 (input 2) and the input to the second prediction technique 860 is the original locally-obtained data 810 (input 3). In this example, the first prediction technique 840 attempts to predict (and thus learns to predict) the original locally obtained data 810. In this example, the second prediction technique 840 may be an identity function.

In another implementation, the first prediction technique 840 uses transformed data and tries to estimate how the data was transformed, e.g., a first predictor may try to estimate spatial relation between patches extracted from image. In one example, the input to the first prediction technique 840 is the transformed locally-obtained data 820 (input 2), and the second prediction is the transform parameters 830 or is a prediction generated using the second prediction technique 860 based on the transform parameters 830. The second prediction technique 860 may be an identity function.

In another implementation, the first prediction technique 840 is an autoencoder, e.g. an autoencoder that encodes and decodes images. In this example, the input to the first prediction technique 840 is the original locally-obtained data 810 (input 1) and the first prediction technique is an autoencoder (e.g., encoder and decoder). In this example, and the second prediction is the original locally-obtained data 810 (input 1) or is a prediction generated using the second prediction technique 860 based on the original locally-obtained data 810 (input 1). The second prediction technique 860 may be an identity function.

As described above, one aspect of the present technology is the gathering and use of data to improve user experiences. The present disclosure contemplates that in some instances, this gathered data may include personal information data that uniquely identifies a specific person or can be used to identify interests, traits, or tendencies of a specific person. For example, a device may learn preferences for a variety of different users. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve a content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, without changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
   generating a first prediction using a first prediction technique and locally-obtained data, the first prediction technique using a first machine learning model, the first machine learning model distributed by a second device to a plurality of user devices;
   generating a second prediction using a second prediction technique and the locally-obtained data;
   determining a machine learning model update for the first machine learning model using the second prediction technique to provide ground truth, wherein the machine learning model update is determined based on the first prediction and the second prediction; and
   providing the machine learning model update to the second device, wherein the second device is configured to create an updated machine learning model based on the machine learning model update and distribute the updated machine learning model to the plurality of user devices.

2. The method of claim 1, wherein the second prediction technique requires more time, processing resources, or power than the first prediction technique.

3. The method of claim 1, wherein:
   the first prediction technique is a machine learning model configured to estimate an image characteristic of an image of the physical environment proximate the electronic device without using data from a non-image sensor; and
   the second prediction technique is configured to estimate the image characteristic using the data from the non-image sensor.

4. The method of claim 1, wherein:
   the first prediction technique is a machine learning model configured to estimate pixel depths using a monocular image of a physical environment proximate the electronic device; and
   the second prediction technique is configured to estimate the pixel depths using data from a depth camera.

5. The method of claim 1, wherein:
   the first prediction technique is a machine learning model configured to perform a computer vision task using a single image of a physical environment proximate the electronic device; and
   the second prediction technique is configured to perform the computer vision task using a plurality of images of the physical environment proximate the electronic device.

6. The method of claim 5, wherein the plurality of images comprises images corresponding to different times of day, different lighting conditions, or different viewpoints of the physical environment.

7. The method of claim 5, wherein the computer vision task comprises semantic segmentation, content hallucination, object detection, object identification, or plane estimation.

8. The method of claim 1, wherein:
   the first prediction technique is a machine learning model configured to recognize speech using only audio data; and
   the second prediction technique is configured to recognize speech using audio data and image data.

9. The method of claim 1, wherein:
   the first prediction technique is a machine learning model configured to perform a task without performing an iterative simulation or optimization; and
   the second prediction technique is configured to perform the task using the iterative simulation or optimization.

10. The method of claim 1, wherein:
    the first prediction technique is a machine learning model configured to perform a task without data from a third device in a same physical environment as the electronic device; and the second prediction technique is configured to perform the task using the data from the third device.

11. The method of claim 1, wherein:
the first prediction technique is a machine learning model configured to determine location based on an image; and
the second prediction technique is configured to determine location based on global positioning system (GPS) data, location beacon data, or movement sensor data.

12. The method of claim 1, wherein the second device is configured to:
receive machine learning model updates from multiple devices of the plurality of user device;
create the updated machine learning model based on the machine learning model updates; and
distribute the updated machine learning model to the plurality of user devices.

13. The method of claim 1, wherein the machine learning model update is a gradient and the first prediction technique comprises a neural network.

14. The method of claim 1, wherein:
generating the first prediction comprises inputting an altered version of the locally-obtained data or limited information about the locally-obtained data to the first machine learning model.

15. The method of claim 14, wherein the altered version of the locally-obtained data is an incomplete image created by removing a portion of a complete image, wherein the second prediction is based on the complete image.

16. The method of claim 14, wherein the altered version of the locally-obtained data is an altered image created by altering rotation, blur, scaling, brightness, or noise of an unaltered image, wherein the second prediction is based on the unaltered image.

17. The method of claim 14, wherein the second prediction is further based on additional information.

18. The method of claim 1 further comprising:
generating transformed data from the locally-obtained data based on transformation parameters; and
generating the first prediction using the transformed data as input to the first machine learning model, wherein the second prediction is generated based on using the transformation parameters as input to the second prediction technique.

19. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
generating a first prediction using a first prediction technique and locally-obtained data, the first prediction technique using a first machine learning model, the first machine learning model distributed by a second device to a plurality of user devices;
generating a second prediction using a second prediction technique and the locally-obtained data;
determining a machine learning model update for the first machine learning model using the second prediction technique to provide ground truth, wherein the machine learning model update is determined based on the first prediction and the second prediction; and
providing the machine learning model update to the second device, wherein the second device is configured to create an updated machine learning model based on the machine learning model update and distribute the updated machine learning model to the plurality of user devices.

20. The device of claim 19, wherein the second prediction technique requires more time, processing resources, or power than the first prediction technique.

21. The device of claim 19, wherein the second device is configured to:
receive machine learning model updates from multiple devices of the plurality of user device;
create the updated machine learning model based on the machine learning model updates; and
distribute the updated machine learning model to the plurality of user devices.

22. The device of claim 19, wherein the machine learning model update is a gradient and the first prediction technique comprises a neural network.

23. The device of claim 19, wherein:
generating the first prediction comprises inputting an altered version of the locally-obtained data or limited information about the locally-obtained data to the first machine learning model.

24. The device of claim 19, wherein the altered version of the locally-obtained data is an incomplete image created by removing a portion of a complete image, wherein the second prediction is based on the complete image.

25. A non-transitory computer-readable storage medium, storing program instructions computer-executable on a computer to perform operations comprising:
generating a first prediction using a first prediction technique and locally-obtained data, the first prediction technique using a first machine learning model, the first machine learning model distributed by a second device to a plurality of user devices;
generating a second prediction using a second prediction technique and the locally-obtained data;
determining a machine learning model update for the first machine learning model using the second prediction technique to provide ground truth, wherein the machine learning model update is determined based on the first prediction and the second prediction; and
providing the machine learning model update to the second device, wherein the second device is configured to create an updated machine learning model based on the machine learning model update and distribute the updated machine learning model to the plurality of user devices.

* * * * *